No. 738,441. PATENTED SEPT. 8, 1903.
J. HEISSENBERGER.
REGISTERING MECHANISM.
APPLICATION FILED JAN. 3, 1903.
NO MODEL.

Witnesses
Chas. K. Davies.
M. E. Moore.

Inventor
John Heissenberger,
By Wm. J. Moore
Attorney

No. 738,441. Patented September 8, 1903.

UNITED STATES PATENT OFFICE.

JOHN HEISSENBERGER, OF NEW YORK, N. Y.

REGISTERING MECHANISM.

SPECIFICATION forming part of Letters Patent No. 738,441, dated September 8, 1903.

Application filed January 3, 1903. Serial No. 137,657. (No model.)

*To all whom it may concern:*

Be it known that I, JOHN HEISSENBERGER, a citizen of the United States, residing at New York, in the county of New York and State of New York, have invented certain new and useful Improvements in Registering Mechanism, of which the following is a specification.

My invention relates to improvements in registering mechanism, and is adapted for use with any kind of a mechanism, device, or instrument having an indicating-dial and a registering pointer or hand, such as in use in scales, steam and other indicators, thermometers, weighing-scales, strength-testing machines, clocks, as well as in various coin-controlled machines where an indicator is used, as in weighing-machines, punching-machines, strength-testing machines, and all other devices where a pointer and dial is used, either automatically or mechanically operated.

The object of my invention is the provision of a simple and inexpensive registering or indicating mechanism which will display a suitable sign or signal and simultaneously indicate or register a certain number, making my device useful in punching-machines, weighing-machines, or the like, to designate or tell a fortune or for other purposes.

With this object in view my invention consists of a registering or indicating mechanism embodying novel features of construction and combination of parts, substantially as disclosed herein.

Figure 1:
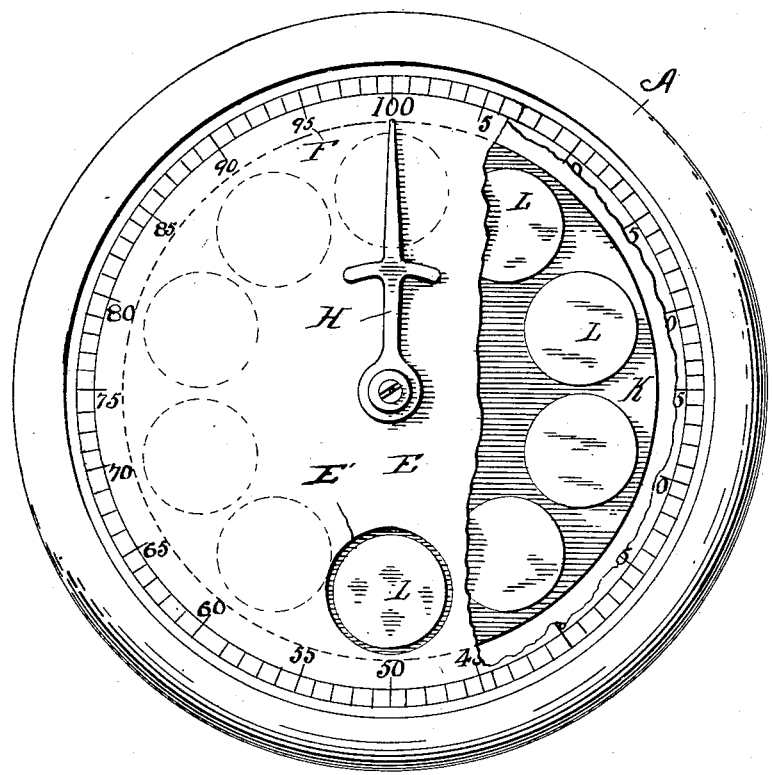
Figure 2:
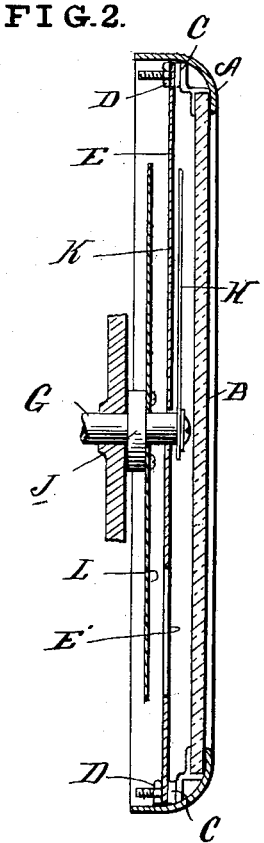
Figures 3, 4:
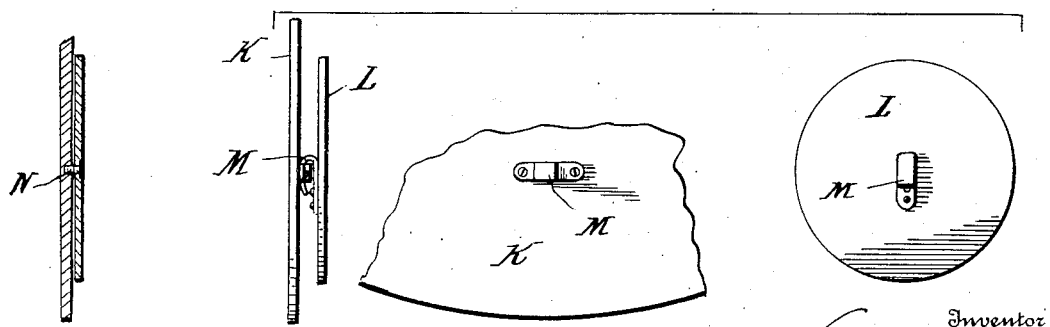

Figure 1 represents a front elevation of my device, and Fig. 2 represents a vertical sectional view thereof. Figs. 3 and 4 are detail views of the indicating-disks.

In the drawings the letter A designates a ring or frame which holds the sight-glass B, said glass being retained in place by the clamps C, and in rear of said glass is secured by the clamping-nuts D the dial E, which is provided with a circular opening E' and with a series of numbers F from "5" to "100," although any number of such numbers may be used.

Passing through the dial is a shaft G, to the outer portion of which is secured the pointer H, and to the inner portion, by means of the collar J, is secured the disk K. This disk, it will thus be seen, turns with the pointer and carries upon its face a series of circles L, which may be formed upon the disk or may be detachably connected by means of clips M or by screws N in order to permit changing of these indicating devices. Upon these circles or plates may be placed views, figures, pictures, instructions, or fortune-telling matter, as circumstances may permit.

It will thus be seen that I provide a device in which when the shaft is turned in any desired manner the pointer and disk move simultaneously, and the pointer will stop upon a certain number, and one of the disks will show in rear of the sight-opening, the gist of my invention residing mainly in the construction of the disk and pointer moving simultaneously and indicating both upon the dial and disk, making my device useful for various purposes.

I claim—

1. An indicating or registering device, consisting of a frame, a dial supported in said frame having indications upon its face and a sight-opening therethrough, a shaft passing through said dial, a pointer on the outer end of the shaft and a disk carried by the inner portion of the shaft and moving simultaneously with the pointer and visible through the sight-opening of the dial and indicating devices adapted to be removably secured upon the disk to enable the disk to be used for various purposes.

2. An indicating and registering device, consisting of a frame, a sight-glass mounted in the frame, a dial having indications upon its face and a sight-opening therethrough, a securing device engaging the dial and sight-glass to secure both in the frame, a shaft passing through the dial, a collar on said shaft, a pointer carried by said shaft and traveling over the dial and a disk rigidly secured to the collar on said shaft in rear of the dial and carrying indicating devices adapted to be removed to permit of the use of various kinds of indications and to show through the sight-opening of the dial.

In testimony whereof I affix my signature in presence of two witnesses.

JOHN HEISSENBERGER.

Witnesses:
JAMES J. JORDAN,
JACOB AARON.